(12) United States Patent
Zabroda et al.

(10) Patent No.: US 8,231,056 B2
(45) Date of Patent: Jul. 31, 2012

(54) SYSTEM FOR AND METHOD OF PROTECTING AN INTEGRATED CIRCUIT FROM OVER CURRENTS

(75) Inventors: Oleksiy Zabroda, Campbell, CA (US); Ericson W. Cheng, Santa Clara, CA (US); Hung Xuan Ngo, San Jose, CA (US)

(73) Assignee: Authentec, Inc., Melbourne, FL (US)

( * ) Notice: Subject to any disclaimer, the term of this patent is extended or adjusted under 35 U.S.C. 154(b) by 837 days.

(21) Appl. No.: 11/397,449

(22) Filed: Apr. 3, 2006

(65) Prior Publication Data
US 2007/0207681 A1    Sep. 6, 2007

Related U.S. Application Data

(60) Provisional application No. 60/669,520, filed on Apr. 8, 2005.

(51) Int. Cl.
*H05K 7/02* (2006.01)

(52) U.S. Cl. ......... 235/454; 382/124; 348/77; 340/5.83; 283/68; 361/220; 257/680; 257/701; 257/723; 257/725; 257/787

(58) Field of Classification Search .............. 235/380, 235/454; 348/77; 340/5.2, 5.83; 283/68, 283/69; 361/220; 257/431, 226, 528, 503, 257/506, 680, 701, 723, 724, 725, 787
See application file for complete search history.

(56) References Cited

U.S. PATENT DOCUMENTS

| 3,955,210 A | * | 5/1976 | Bhatia et al. ............ 257/373 |
| 4,827,527 A | | 5/1989 | Morita et al. .............. 382/4 |
| 5,283,735 A | | 2/1994 | Gross et al. .......... 364/413.02 |
| 5,327,161 A | | 7/1994 | Logan et al. ............ 345/157 |
| 5,400,206 A | * | 3/1995 | Barnes et al. ............ 361/72 |
| 5,610,993 A | | 3/1997 | Yamamoto ............ 382/124 |

(Continued)

FOREIGN PATENT DOCUMENTS

EP    1 113 383 A2    7/2001

(Continued)

OTHER PUBLICATIONS

S. Shigematsu et al., "A Single-Chip Fingerprint Sensor and Identifier", IEEE Journal of Solid-State Circuits, vol. 34, No. 12, Dec. 1999, pp. 1852-1859.

(Continued)

*Primary Examiner* — Michael Shingleton
(74) *Attorney, Agent, or Firm* — Allen, Dyer, Doppelt, Milbrath & Gilchrist, P.A.

(57) ABSTRACT

A contact detector having power switches for disconnecting power to portions of the contact sensor when an over current is detected is disclosed. The power switches thus protect the contact sensor from over-current as the result of latch-up or other current-generating conditions. These current-generating conditions are often the result of ESD events on a surface of the contact detector. A contact detector comprises an exposed surface for detecting the presence of an object, an insulating surface, and a protection element disposed under the insulating surface for controlling power to the contact detector. The protection element is configured to disconnect power to the contact detector when a current to the contact detector is detected above a threshold. Preferably, the contact detector is a finger swipe sensor, but it can be a finger placement sensor or any other type of device that functions on contact with a finger or other patterned object.

17 Claims, 8 Drawing Sheets

U.S. PATENT DOCUMENTS

| | | | |
|---|---|---|---|
| 5,612,719 A | 3/1997 | Beernink et al. | 345/173 |
| 5,666,113 A | 9/1997 | Logan | 341/34 |
| 5,689,285 A | 11/1997 | Asher | 345/161 |
| 5,740,276 A | 4/1998 | Tomko et al. | 382/210 |
| 5,821,930 A | 10/1998 | Hansen | 345/340 |
| 5,825,352 A | 10/1998 | Bisset et al. | 345/173 |
| 5,825,907 A | 10/1998 | Russo | 382/124 |
| 5,862,248 A * | 1/1999 | Salatino et al. | 382/124 |
| 5,880,411 A | 3/1999 | Gillespie et al. | 178/18.01 |
| 5,907,327 A | 5/1999 | Ogura et al. | 345/339 |
| 5,909,211 A | 6/1999 | Combs et al. | 345/172 |
| 5,940,526 A | 8/1999 | Setlak et al. | 382/124 |
| 5,943,052 A | 8/1999 | Allen et al. | 345/341 |
| 5,963,679 A | 10/1999 | Setlak | 382/312 |
| 5,995,084 A | 11/1999 | Chan et al. | 345/173 |
| 5,995,623 A | 11/1999 | Kawano et al. | 380/21 |
| 5,995,630 A | 11/1999 | Borza | 380/54 |
| 6,011,849 A | 1/2000 | Orrin | 380/42 |
| 6,035,398 A | 3/2000 | Bjorn | 713/186 |
| 6,057,830 A | 5/2000 | Chan et al. | 345/157 |
| 6,061,051 A | 5/2000 | Chan et al. | 345/173 |
| 6,135,958 A | 10/2000 | Mikula-Curtis et al. | 600/443 |
| 6,141,753 A | 10/2000 | Zhao et al. | 713/176 |
| 6,208,329 B1 | 3/2001 | Ballare | 345/173 |
| 6,219,793 B1 | 4/2001 | Li et al. | 713/202 |
| 6,219,794 B1 | 4/2001 | Soutar et al. | 713/202 |
| 6,248,655 B1 | 6/2001 | Machida et al. | 438/597 |
| 6,259,804 B1 | 7/2001 | Setlak et al. | 382/124 |
| 6,278,443 B1 | 8/2001 | Amro et al. | 345/173 |
| 6,317,508 B1 | 11/2001 | Kramer et al. | 382/124 |
| 6,323,846 B1 | 11/2001 | Westerman et al. | 345/173 |
| 6,330,345 B1 | 12/2001 | Russo et al. | 382/115 |
| 6,404,900 B1 | 6/2002 | Qian et al. | 382/103 |
| 6,408,087 B1 | 6/2002 | Kramer | 382/124 |
| 6,501,142 B2 | 12/2002 | Thomas et al. | 257/414 |
| 6,518,560 B1 | 2/2003 | Yeh et al. | 250/214 |
| 6,535,622 B1 | 3/2003 | Russo et al. | 382/124 |
| 6,546,122 B1 | 4/2003 | Russo | 382/125 |
| 6,563,101 B1 | 5/2003 | Tullis | 250/208.1 |
| 6,601,169 B2 | 7/2003 | Wallace, Jr. et al. | 713/151 |
| 6,628,812 B1 | 9/2003 | Setlak et al. | 382/124 |
| 6,661,631 B1 * | 12/2003 | Meador et al. | 361/93.1 |
| 6,667,439 B2 | 12/2003 | Salatino et al. | 174/52.1 |
| 6,668,072 B1 | 12/2003 | Hribernig et al. | 382/124 |
| 6,681,034 B1 | 1/2004 | Russo | 382/125 |
| 6,683,971 B1 | 1/2004 | Salatino et al. | 382/124 |
| 6,744,910 B1 | 6/2004 | McClurg et al. | 382/124 |
| 6,754,365 B1 | 6/2004 | Wen et al. | 382/100 |
| 6,804,121 B2 | 10/2004 | Fischbach et al. | 361/752 |
| 6,804,378 B2 | 10/2004 | Rhoads | 382/100 |
| 6,876,756 B1 | 4/2005 | Vieweg | 382/124 |
| 6,961,452 B2 | 11/2005 | Fujii | 382/125 |
| 6,998,721 B2 * | 2/2006 | Zhou | 257/790 |
| 7,002,553 B2 | 2/2006 | Shkolnikov | 345/169 |
| 7,003,670 B2 | 2/2006 | Heaven et al. | 713/186 |
| 7,020,270 B1 | 3/2006 | Ghassabian | 379/368 |
| 7,054,470 B2 | 5/2006 | Bolle et al. | 382/124 |
| 7,113,179 B2 | 9/2006 | Baker et al. | 345/178 |
| 7,136,514 B1 | 11/2006 | Wong | 382/124 |
| 7,197,168 B2 | 3/2007 | Russo | 382/125 |
| 7,263,212 B2 | 8/2007 | Kawabe | 382/124 |
| 7,280,679 B2 | 10/2007 | Russo | 382/124 |
| 7,299,360 B2 | 11/2007 | Russo | 713/182 |
| 7,339,572 B2 | 3/2008 | Schena | 345/156 |
| 7,369,688 B2 | 5/2008 | Ser et al. | 382/124 |
| 7,474,772 B2 | 1/2009 | Russo et al. | 382/124 |
| 2001/0012384 A1 * | 8/2001 | Kalnitsky et al. | 382/124 |
| 2002/0130673 A1 | 9/2002 | Pelrine et al. | 324/727 |
| 2002/0186203 A1 | 12/2002 | Huang | 345/157 |
| 2002/0188854 A1 | 12/2002 | Heaven et al. | 713/186 |
| 2003/0002718 A1 | 1/2003 | Hamid | 382/124 |
| 2003/0028811 A1 | 2/2003 | Walker et al. | 713/202 |
| 2003/0044051 A1 | 3/2003 | Fujieda | 382/124 |
| 2003/0115490 A1 | 6/2003 | Russo et al. | 713/202 |
| 2003/0123714 A1 | 7/2003 | O'Gorman et al. | 382/124 |
| 2003/0126448 A1 | 7/2003 | Russo | 713/186 |
| 2003/0135764 A1 | 7/2003 | Lu | 713/202 |
| 2003/0214481 A1 | 11/2003 | Xiong | 345/157 |
| 2003/0215116 A1 | 11/2003 | Brandt et al. | 382/124 |
| 2004/0014457 A1 | 1/2004 | Stevens | 455/411.1 |
| 2004/0128521 A1 | 7/2004 | Russo | 713/186 |
| 2004/0148526 A1 | 7/2004 | Sands et al. | 713/202 |
| 2004/0156538 A1 * | 8/2004 | Greschitz et al. | 382/124 |
| 2004/0186882 A1 | 9/2004 | Ting | 709/202 |
| 2004/0208348 A1 | 10/2004 | Baharav et al. | 382/124 |
| 2004/0252867 A1 | 12/2004 | Lan et al. | 382/124 |
| 2004/0258282 A1 | 12/2004 | Bjorn et al. | 382/124 |
| 2004/0263479 A1 | 12/2004 | Shkolnikov | 345/169 |
| 2005/0012714 A1 | 1/2005 | Russo et al. | 345/157 |
| 2005/0041885 A1 | 2/2005 | Russo | 382/289 |
| 2005/0144329 A1 | 6/2005 | Tsai et al. | 710/1 |
| 2005/0169503 A1 | 8/2005 | Howell et al. | 382/115 |
| 2005/0179657 A1 | 8/2005 | Russo et al. | 345/163 |
| 2005/0195546 A1 * | 9/2005 | Itoshima et al. | 361/93.1 |
| 2005/0259851 A1 | 11/2005 | Fyke | 382/124 |
| 2005/0259852 A1 | 11/2005 | Russo | 382/124 |
| 2006/0002597 A1 | 1/2006 | Rowe | 382/124 |
| 2006/0034043 A1 | 2/2006 | Hisano et al. | 361/681 |
| 2006/0078174 A1 | 4/2006 | Russo | 382/121 |
| 2006/0103633 A1 | 5/2006 | Gioeli | 345/173 |
| 2006/0242268 A1 | 10/2006 | Omernick et al. | 709/219 |
| 2006/0280346 A1 | 12/2006 | Machida | 382/124 |
| 2007/0014443 A1 | 1/2007 | Russo | 382/124 |
| 2007/0016779 A1 | 1/2007 | Lyle | 713/169 |
| 2007/0034783 A1 | 2/2007 | Eliasson et al. | 250/221 |
| 2007/0038867 A1 | 2/2007 | Verbauwhede et al. | 713/186 |
| 2007/0061126 A1 | 3/2007 | Russo et al. | 703/24 |
| 2007/0125937 A1 | 6/2007 | Eliasson et al. | 250/221 |
| 2007/0146349 A1 | 6/2007 | Errico et al. | 345/174 |
| 2007/0274575 A1 | 11/2007 | Russo | 382/124 |
| 2008/0013808 A1 | 1/2008 | Russo et al. | 382/125 |

FOREIGN PATENT DOCUMENTS

| | | |
|---|---|---|
| EP | 1 113 405 A2 | 7/2001 |
| EP | 1 143 374 B1 | 2/2005 |
| WO | WO 98/15225 | 4/1998 |
| WO | WO 98/52145 | 11/1998 |
| WO | WO 98/52146 | 11/1998 |
| WO | WO 98/52147 | 11/1998 |
| WO | WO 98/52157 | 11/1998 |
| WO | WO 99/43258 | 9/1999 |
| WO | WO 00/68873 | 11/2000 |
| WO | WO 00/68874 | 11/2000 |
| WO | WO 00/72507 A1 | 11/2000 |
| WO | WO 01/09819 A1 | 2/2001 |
| WO | WO 01/09936 A1 | 2/2001 |
| WO | WO 01/29731 A1 | 4/2001 |
| WO | WO 01/39134 A3 | 5/2001 |
| WO | WO 01/65470 A1 | 9/2001 |
| WO | WO 01/73678 A1 | 10/2001 |
| WO | WO 01/77994 A1 | 10/2001 |
| WO | WO 01/80166 A3 | 10/2001 |
| WO | WO 01/94892 A3 | 12/2001 |
| WO | WO 01/94902 A2 | 12/2001 |
| WO | WO 01/94966 A2 | 12/2001 |
| WO | WO 01/95305 A1 | 12/2001 |
| WO | WO 01/99035 A2 | 12/2001 |
| WO | WO 01/99036 A2 | 12/2001 |
| WO | WO 02/15209 A3 | 2/2002 |
| WO | WO 02/15267 A2 | 2/2002 |
| WO | WO 02/44998 A1 | 6/2002 |
| WO | WO 02/069386 A1 | 9/2002 |
| WO | WO 02/071313 A1 | 9/2002 |
| WO | WO 02/073375 A2 | 9/2002 |
| WO | WO 02/086800 A1 | 10/2002 |
| WO | WO 02/093462 A1 | 11/2002 |
| WO | WO 02/095349 A1 | 11/2002 |
| WO | WO 03/007127 A2 | 1/2003 |
| WO | WO 03/017211 A2 | 2/2003 |
| WO | WO 03/049011 A1 | 6/2003 |
| WO | WO 03/049012 A2 | 6/2003 |
| WO | WO 03/049016 A2 | 6/2003 |
| WO | WO 03/049104 A1 | 6/2003 |
| WO | WO 03/075210 A2 | 9/2003 |

OTHER PUBLICATIONS

I-Control, PDS 3000 TM Product Brief "Mobile Finger -Based Control Sensor", 2 pages, Jul. 2003.

A. Conry-Murray, "Biometrics", http://www.networkmagazine.com/shared/article/showArticle.jhtml?articleId=17601104, Jul. 7, 2002, pp. 1 of 5.

Ballard and Brown, "Computer Vision", Prentice Hall, 1982, pp. 66-69.

Stephen Mascaro and Harry Asada,"Fingernail Touch Sensors: Spatially Distributed Measurement and Hemodynamic Modeling", 2000 IEEE, pp. 3422-3427.

Choonwoo Ryu et al. "Super-template Generation Using Successive Bayesian Estimation for Fingerprint Enrollment", Jan. 2005 Springer-Verlag Berlin Heidelberg, pp. 710-719.

Dongiae Lee et al. "Fingerprint Fusion Based on Minutiae and Ridge for Enrollment", Jan. 2003 Springer-Verlag Berlin Heidelberg, pp. 478-485.

Koichi Sasakawa et al. "Personal Verification System with High Tolerance of Poor Quality Fingerprints", May 1990 Machine Vision Systems Integration in Industry, pp. 265272.

Michal Irani et al. "Improving Resolution by Image Registration", May 1991 by Academic Press, Inc., pp. 231-239.

Qinfen Zheng et al. "A Computational Vision Approach to Image Registration", Aug. 1992 IEEE, pp. 193-197.

Wei-Yun Yau et al. "Fingerprint Templates Combination", Jan. 2004 Springer-Verlag Berlin Heidelberg, pp. 449-460.

Xudong Jiand et al. "Detecting the Fingerprint Minutiae by Adaptive Tracing the Gray-Level Ridge", May 2001, pp. 999-1013, Published by Elsevier Science Ltd.

Xudong Jiang et al. "Fingerprint Minutiae Matching Based on the Local and Global Structures", Sep. 2000 Ieee, pp. 1038-1041.

Xudong Jiang et al., "Fingerprint Minutiae Matching Based on the Local and Global Structures," Sep. 2000, pp. 1038-1041, IEEE.

Kyung Deok Yu et al., "A Fingerprint Matching Algorithm based on Radial Structure and a Structure-Rewarding Scoring Strategy," Jun. 2005, pp. 656-664, AVBPA, LNCS, Audio- and Video-Based Biometric Person Authentication Springer-Verlag Berlin Heidelberg.

* cited by examiner

SYSTEM FOR AND METHOD OF PROTECTING AN INTEGRATED CIRCUIT FROM OVER CURRENTS

RELATED APPLICATION

This application claims priority under 35 U.S.C. §119(e) of the U.S. provisional patent application Ser. No. 60/669,520, filed Apr. 8, 2005, and titled "Dynamically Illuminated Biometric Sensor, Modular Packaging Technology, and Over-Current Chip Protection Architecture," which is hereby incorporated by reference.

FIELD OF THE INVENTION

This invention is related to contact detectors. More specifically, this invention is related to systems for and methods of protecting contact detectors from excessive currents and resulting damage.

BACKGROUND OF THE INVENTION

Integrated circuits, especially those with surfaces that are exposed to human contact, are susceptible to damage resulting from electrostatic discharge (ESD), short circuits, mechanical damage, and similar occurrences. These occurrences can induce latch-up conditions in at least a portion of the integrated circuit or can produce other damage that results in excessive or over currents. These over currents can cause the integrated circuit to get too hot, rupture junctions, short circuit across insulators, open circuit conductors, malfunction, and even melt. The increased temperature can injure a user, can generate current overloads that damage the power supply or battery of the integrated circuit, of companion circuits, or any combination of these.

Some prior art solutions use protection switches. The protection switches are placed external to the integrated circuit so that they will not be exposed to the ESD events or other occurrences, thus protecting them from damage suffered by other portions of the integrated circuit. These protection switches contain a current detection circuit, a current switch, and a reset signal generator. When latch-up occurs, the current detection circuit detects excessive current consumption and disconnects the entire integrated circuit from the power supply source for a time sufficient to remove the latch-up conditions. When the power supply voltage is restored, the reset circuit returns the digital blocks that form the integrated circuit to their initial conditions. The reset circuit also sets a flag to indicate to a host processor that the data previously stored in the digital blocks is lost or is unreliable.

These external protection switches increase the cost of the final product of which they form a part. They also take up space on printed circuit boards. Space is typically at a premium on small, portable products such as cell phones and personal digital assistants. These external protection switches also reset the entire integrated circuit every time latch-up occurs, even when only a small portion of the integrated circuit is affected by latch-up. This occurs even though some areas of the integrated circuit are often not affected by latch-up, are undamaged, and consequently do not need to be reset.

SUMMARY OF THE INVENTION

Embodiments of the present invention protect contact detectors, such as fingerprint sensors, from damage stemming from electrostatic discharge (ESD) events, mechanical damage, and similar events. Electrostatic charges stored on a finger, body of a user, or both can be discharged to devices that the finger contacts. This discharge often triggers a latch-up condition, which in turn can draw excessive current. Embodiments of the present invention have a power switch, insulated from ESD events, that disconnects power to portions of the contact detector when an over current condition is detected on the contact sensor. Embodiments of the present invention also include a state machine for recovering from latch-up and disconnecting portions of the device that are permanently damaged.

Other embodiments, formed on a single integrated circuit using NMOS and PMOS transistors, minimize the occurrence of latch-up by adequately spacing the NMOS and PMOS transistors. And still other embodiments divide a surface of a contact detector and associated electronics into multiple blocks, each controlled by a dedicated power switch. Damaged areas of the contact detector are functionally disconnected from the contact detector. Thus, rather than disconnecting a large block of electronics when only a small area of the contact detector is damaged, the small area is disconnected using its dedicated power switch, thus leaving more of the contact detector for subsequent functioning. Thus, more finely grained control of damaged areas is provided.

In a first aspect of the present invention, a contact detector includes an exposed surface for detecting the presence of an object, an insulating surface, and a protection element. The protection element is disposed under the insulating surface. This position protects it from ESD and similar events, and is used to control power to the contact detector. The protection element is configured to disconnect power to the contact detector when a current to the contact detector above a threshold is detected. Preferably, the contact detector forms a finger image sensor, such as a finger swipe sensor or a finger placement sensor. The finger swipe sensor includes a sensing array, such as one using capacitive elements, electric field elements, thermal elements, or optical elements.

In other embodiments, the exposed surface overlies an analog block for capturing analog data generated by contacting the contact detector and a digital block for processing digital data generated from the analog data. The analog data is preferably finger image data and the digital data corresponds to the finger image data. Preferably, the first protection element includes a first switch for controlling power to the analog block and a second switch for controlling power to the digital block. The first switch and the second switch are configured to cooperatively disconnect power to the analog block and the digital block and to selectively reconnect power to the analog block and the digital block after a predetermined time. When one or both of the analog and the digital block is determined to have suffered irreparable damage, power is not reconnected to the damaged block. Undamaged blocks continue to operate.

In another embodiment, the contact detector also includes a state machine. The state machine is used to place the first switch and the second switch into a selected one of an operating mode, a stand-by mode, and a disconnect mode. Preferably, the state machine is implemented on a host processor.

Preferably, the insulating surface surrounds the exposed surface. Alternatively, the insulating surface merely borders opposing ends of the exposed surface.

In a second aspect of the present invention, a fingerprint sensor includes an exposed surface overlying a plurality of blocks, an insulating surface, and a plurality of protection elements. Each block contains a contact detector element for detecting the presence of a patterned image on the exposed surface. The protection elements are disposed under the insulating surface and each is used to control power to one of the plurality of blocks. Each protection element is configured to disconnect power to a corresponding block from the plurality of blocks when a current to the block exceeds a threshold. Preferably, the blocks contain an array of sensing elements for capturing swiped fingerprint images and digital components for processing swiped finger image data. Preferably, signals fed to and generated by the plurality of protection elements are static.

The insulating surface includes a non-conductive material, such as a non-conductive polymeric material. In one embodiment, the insulating material also includes a grounded conductive material, such as a metal, overlying the non-conductive material.

In a third aspect of the present invention, a method of forming a fingerprint sensor includes forming electronic components in a semiconductor substrate for capturing finger image data; forming a power protection element in the semiconductor substrate for controlling power to the electronic components; and forming an insulating layer over the power protection element, thereby leaving a surface over the electronic components exposed and a surface over the power protection element un-exposed. Preferably, the electronic components form a finger swipe sensor. Alternatively, the electronic components form a finger placement sensor.

The method also includes coupling a state machine to the power protection element. The state machine is for controlling the power protection element to selectively disconnect power to the electronic components in the event an over current is detected on any of the electronic components. The state machine is also used to control the power protection element to selectively reconnect power to a selected one or more of the electronic components after a pre-determined time. Preferably, the state machine is disposed under the insulating layer.

In one embodiment, the electronic components comprise transistors, such as PMOS and NMOS transistors. Both forming the electronic components and forming a power protection element includes spacing the transistors to minimize latch-up.

In a fourth aspect of the present invention, a method of forming a fingerprint sensor comprises forming multiple electronic components in a semiconductor substrate, such that the multiple electronic components are able to capture and process finger image data; forming multiple power protection elements in the semiconductor substrate, each for controlling power to a corresponding one of the multiple electronic components; and forming a protection layer over the multiple power protection elements, thereby leaving the multiple electronic components exposed and the multiple power protection elements un-exposed.

DETAILED DESCRIPTION OF THE PREFERRED EMBODIMENTS

The present invention is directed to protecting contact detectors that have exposed portions, such as the portion of a finger sensor used to capture finger images. These portions are exposed in that they are contacted to capture image data or other data and thus contain or overlie electronics used to process the image or other data. Because these portions come into contact with fingers and materials that can carry electrostatic charges, these portions are necessarily vulnerable to latch-up, which can result in the generation of excessive current that can damage the integrated circuits that form the contact detector. The portions are also susceptible to mechanical and other damage. While much of the discussion that follows focuses on finger image sensors, it will be appreciated that other contact detectors and other types of integrated circuits are able to benefit from the present invention.

Figure 1:
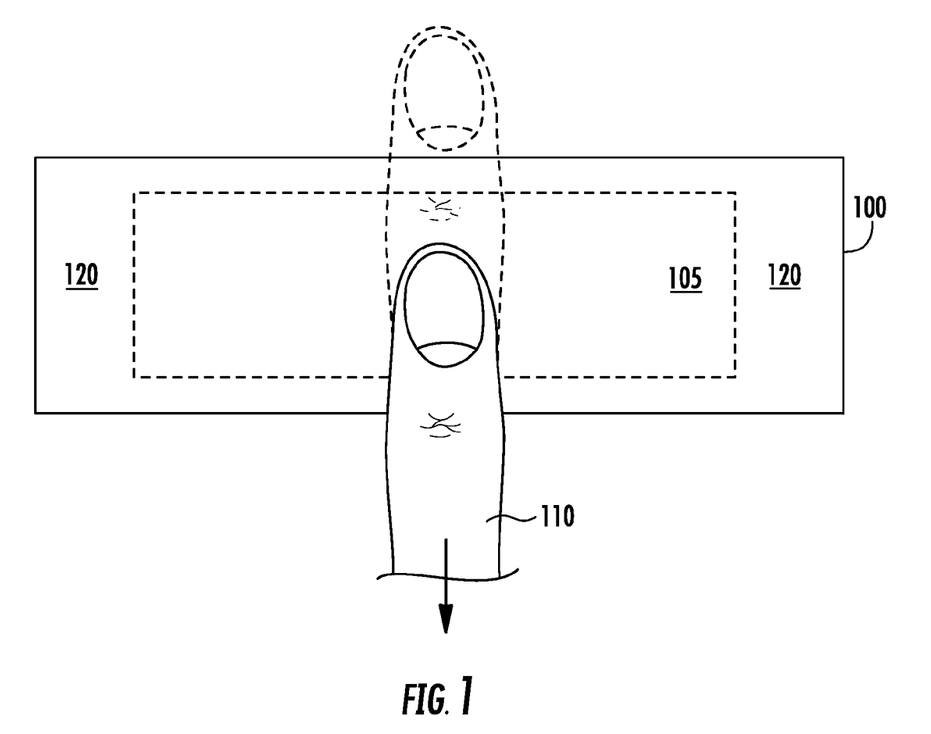
FIG. 1 shows a finger in contact with a fingerprint sensor having an exposed portion for capturing finger images and an un-exposed portion.

FIG. 1 shows a finger 110 being swiped along a finger swipe sensor 100 in accordance with the present invention, with the arrow indicating a swipe direction. The finger swipe sensor 100 contains an exposed surface 105, under which lies electronics that are susceptible to damage from over current and other conditions generated from, for example, electrostatic discharge (ESD) events. The exposed portion 105 is shown much larger in its relation to the finger 110 merely to make the drawing easier to read; the drawings are not to scale. Generally, these electronics that underlie the exposed surface 105 include analog components and digital components. If the finger swipe sensor 100 is a capacitive swipe sensor, which uses capacitors to sense an image of a finger, the analog components can include an array of sense capacitors. If the finger swipe sensor is an optical swipe sensor, which uses charge coupled devices to sense an image of a finger, the analog components can include photodiodes. In either case, the digital components can include processing elements for converting the analog image data into digital data for further processing. ESD, its generation, and its effect on finger sensors are explained in more detail in U.S. patent application Ser. No. 11/070,154, titled "Electrostatic Discharge Protection for a Fingerprint Sensor," and filed Mar. 1, 2005, which is incorporated by reference.

The surface of the exposed portion 105 and the underlying components function by capturing finger images and are thus necessarily exposed to ESD events. Also, because it functions by being contacted by a finger, it is also referred to as a "contact surface," a "contact detector," and the like.

Still referring to FIG. 1, the finger swipe sensor 100 also includes an insulating surface 120 that protects electronics contained below it from ESD events, abrasion, shock, and other damage. Electronics below the insulating surface 120 are thus less susceptible to, for example, latch up and the resulting over currents. Suitable materials for the insulating surface 120 include, but are not limited to, non-conductive polymeric materials such as plastics. The electronics underlying the insulating layer include both analog and digital components for processing finger image data.

Figure 2:
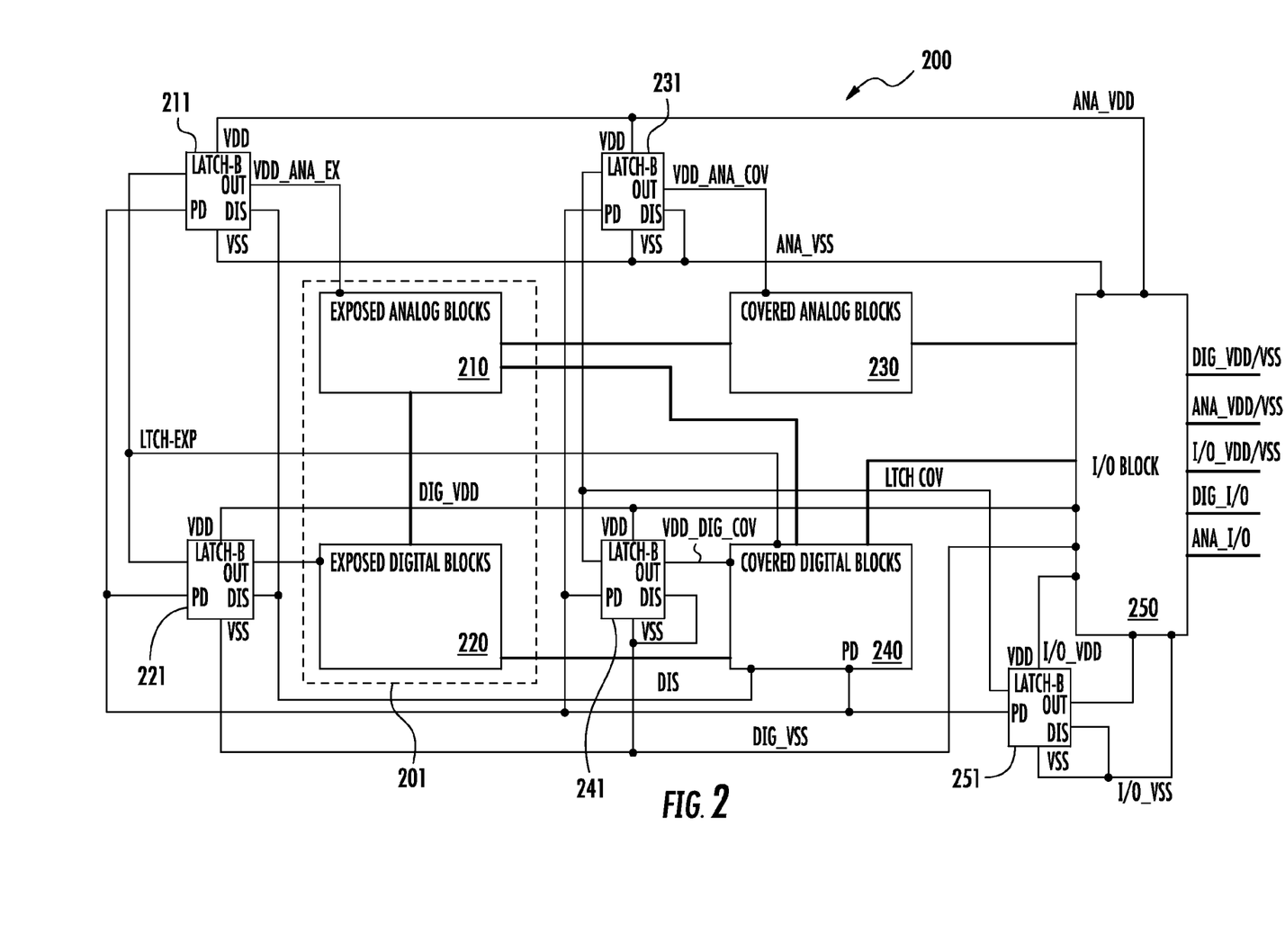
FIG. 2 shows protection switches and the components they protect in accordance with embodiments of the present invention.

FIG. 2 is a schematic of a section of a contact device 200 in accordance with the present invention. The contact device 200 comprises an exposed area 201 having a surface that overlies a block 210 of analog components and a block 220 of digital components (also referred to as uncovered or exposed blocks). As one example, the contact device 200 is a capacitive finger sensor, and the block 210 contains a capacitive sense array. It will be appreciated that the capacitive sense array itself is generally protected from minor abrasions by, for example, a passivation layer, a thin-film, or both. The contact device 200 also comprises an unexposed area that contains an insulating surface (not shown) that overlies a power switch (also referred to as a current switch) 211 for controlling power to the block 210 and a power switch 221 for controlling power to the block 220 (also referred to as covered or un-exposed blocks). The contact device 200 also comprises a block 230 of covered analog components, a block 240 of covered digital components, a covered Input Output (I/O) block 250, a power switch 231 for controlling power to the block 230, a power switch 241 for controlling power to the block 240, and a power switch 251 for controlling power to the I/O block 250. All of the power switches 211, 221, 231, 241, and 251 are protected from ESD events and other damage by the insulating layer that shields them from ESD, such as discharged from a finger or other charged object contacting the exposed area 201.

As one example, in operation, if latch up in the block 210 generates an over current, the power switch 211 detects the over current and raises a signal (on the line LATCH_B, discussed below) indicating the over current. The block 240 receives the signal and generates a signal to the power switches 211 and 221 to remove power from the blocks 210 and 220, respectively, to terminate the latch up condition. After a predetermined time, sufficient to allow the latch up condition to terminate, the power switches 211 and 221 reconnect the blocks 210 and 220 to power. During this process, the switches 231, 241, and 251 do not remove power from the blocks 230, 240, and 250, respectively. In other words, the blocks 230, 240, and 250 are not reset when the blocks 211 and 221 are.

In the embodiment shown in FIG. 2, the block 240 controls the power switches 211, 221, 231, 241, and 251 to place them in an operating mode, a standby mode, and a disconnect mode, all described in more detail below. The block 240 contains a state machine for performing these functions. In other embodiments a host processor external to the contact device 200 performs these functions.

Still referring to FIG. 2, voltage (power supply) lines from the power switches 211, 221, 231, 241, and 251 are coupled to the blocks 210, 220, 230, 240, and 250, respectively, and are controllably routed to the blocks 210, 220, 230, 240, and 250 in accordance with the present invention. All of the power switches 211, 221, 231, 241, and 251 and the block 240 are coupled to one another at a power down (PD) input line for each. A signal on the PD input of one of the power switches 211, 221, 231, 241, and 251 is used to control the power switch to route full power or to route standby power to the blocks 210, 220, 230, 240, and 250, respectively. The power switches 211 and 221 have interconnected input/output (I/O) lines labeled LATCH_B, which are also coupled to the block 240. Similarly, the power switches 231, 241, and 251 have interconnected I/O lines labeled LATCH_B. As described below, a signal on a LATCH_B line is used to indicate an over current. The disconnect (DIS) input for the power switches 211 and 221 is output from block 240. A signal on a DIS line is used to instruct a power switch to permanently disconnect power to the block. This occurs when the block 240 determines that a block is unusable, such as when it raises a signal on its LATCH_B line several consecutive times, indicating, for example, that it cannot recover from latch-up. DIS inputs for the blocks 231, 241, and 251 are not used and are accordingly grounded.

As explained below, when power switches have interconnected LATCH_B inputs, if any of the power switches indicates an over current condition, all the power switches will to cut off power to all the blocks they control power to. The power switches are thus in a wired OR configuration.

VSS (ground) lines from the I/O block 250 are coupled to VSS inputs to the power switches 211, 221, 231, and 241. An analog ANA_VDD (voltage source) line from the I/O block 250 is coupled to VDD inputs of the power switches 211 and 231. An I/O VDD line from the I/O block 250 is coupled to the VDD input of the power switch 251, and the DIS input and the ground input of the power switch 251 are coupled to the ground I/O_VSS output of the I/O block 250. The power line for digital components DIG_VDD from the I/O block 250 couples the power inputs VDD of the power switches 221 and 241. Finally, the I/O lines for all of the blocks 210, 220, 230, 240, and 250 (shown as thick lines) are coupled together.

The I/O block 250 is used to (1) route power and provide ground over the lines AVA_VDD/ANA_VSS to the power switches 211 and 231, which then controllably route power to the (analog) blocks 210 and 230, (2) route power and provide ground over the lines DIG_VDD/DIG_VSS to the power switches 221 and 241, which then controllably route power to the (digital) blocks 220 and 240, (3) receive power and ground for itself over the lines I/O_VDD/I/O_VSS, (4) route analog I/O signals between the block 230 and components external to the contact detector 200, and (5) route digital I/O signals between the block 240 and components external to the contact detector 200. The blocks 210, 220, 230, and 240 are all coupled to one another along their I/O lines.

In operation, as explained briefly above, when a signal on a LATCH_B line indicates over current, power to all the analog and digital blocks that are controlled by power switches coupled to the LATCH_B line is disconnected. At the same time this signal is used by the block 240 to set the reset flag or, if the over-current condition does not disappear, to generate a disable flag. This flag puts the entire contact detector 200 in power down mode (all the power supply switches have common power down signal PD) and generates signal DIS (disconnect) for the exposed blocks of the integrated circuit. All the signals are static. For this reason, the power switches 211, 221, 231, 241, and 251 and the blocks 230, 240, and 250 can be in the power down mode of operation. The blocks 230, 240, and 250 are not considered prone to a physical damage and do not need a disconnect option. In order to disconnect the blocks 210 and 220, the covered blocks 230, 240, and 250 should be functional.

Figure 3:
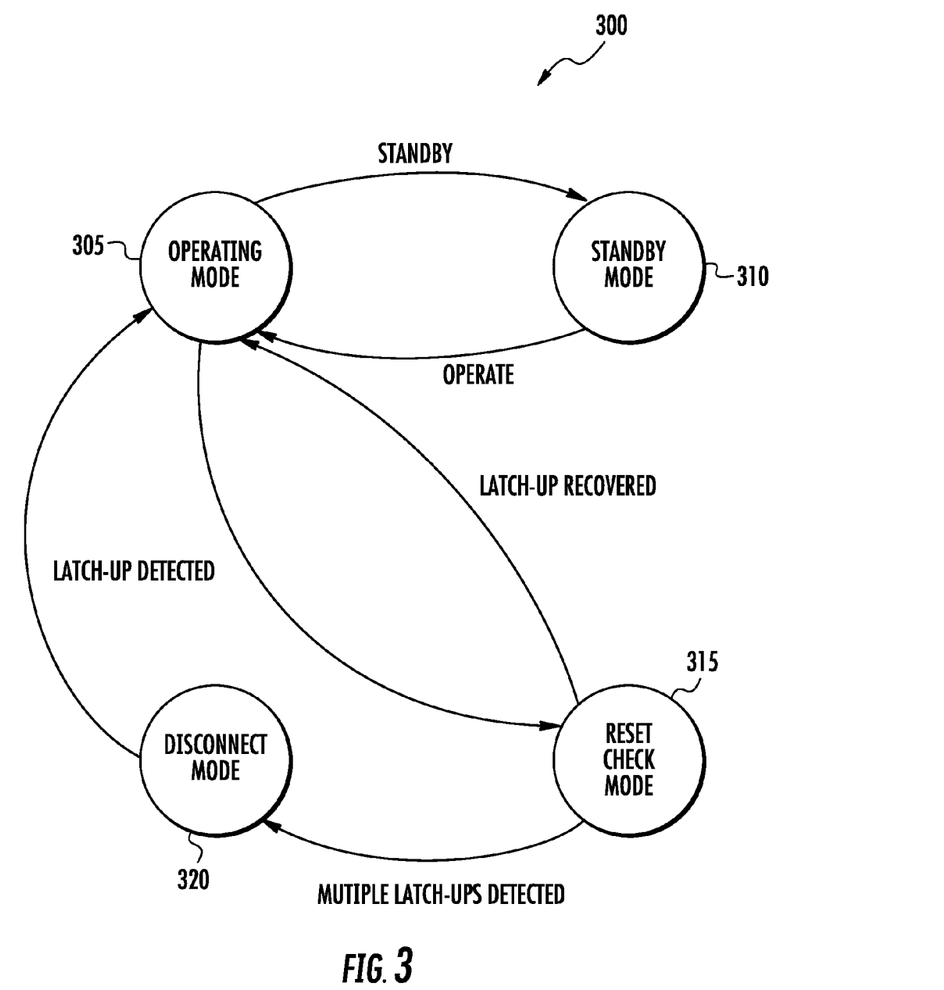
FIG. 3 is a state diagram for implementing a state machine for recovering from latch up in accordance with embodiments of the present invention.

FIG. 3 shows a state diagram 300 for implementing a state machine, such as one executing on the block 240 of FIG. 2, in accordance with the present invention. As explained above, in accordance with one embodiment of the present invention, when an over current is detected anywhere in the finger sensor, control logic on the finger sensor, implemented in the state machine, controls power switches to enter (1) an operating mode 305, in which power is routed from the power switch to a block, (2) a standby mode 310, in which the finger sensor is not being used and only limited power is routed from a power switch to a block so that the block can be quickly placed in the operating mode, (3) a reset check mode 315, entered after an over current is detected, during which each power switch that controls power to electronics in an exposed area disconnects power to the block it controls, giving the block time to allow the latch-up condition to terminate, and (4) a disconnect mode 320, in which power is permanently disconnected from a block. Preferably, the reset check mode 315 is consolidated in the operating mode 305. FIG. 3 shows the operating mode 305 and the reset check mode 315 as distinct merely to simplify the explanation.

Referring to the state diagram 300, from the operating mode 305, raising a signal on a standby line (raised, for example, when the exposed area of the finger sensor has not been contacted by a finger or patterned object for a predetermined time) places the finger sensor in the standby mode 310. In the standby mode, the electrical components of the finger sensor draw less current, thereby conserving power and ensuring that the finger sensor does not heat up unnecessarily. While the finger sensor is in the standby mode 310, when a finger or other object contacts a surface of the finger sensor, the finger sensor goes into the operating mode 305, powering on the electronics.

In the operating mode 305, if an over current is detected, the finger sensor enters the reset check mode 315, where it temporarily disconnects power from one or more of the blocks, allowing any latch-up condition that occurred as a result of the over current to be removed. The finger sensor then returns to the operating mode 305. If, however, an over current is again detected, the finger sensor again returns to the reset check mode 315. If the finger sensor returns to the reset check mode 315 a predetermined number of consecutive times, indicating that a block is permanently damaged, the finger sensor enters the disconnect mode 320, in which the block is flagged as damaged, and accordingly is no longer used. A processor on the finger sensor (e.g., block 240 in FIG. 2) uses the flag to determine that the damaged block is not longer used to store, receive, or process data. The finger sensor then returns to the operating mode 305, for the remainder of the (i.e., the functioning, undamaged) blocks.

Figure 4:
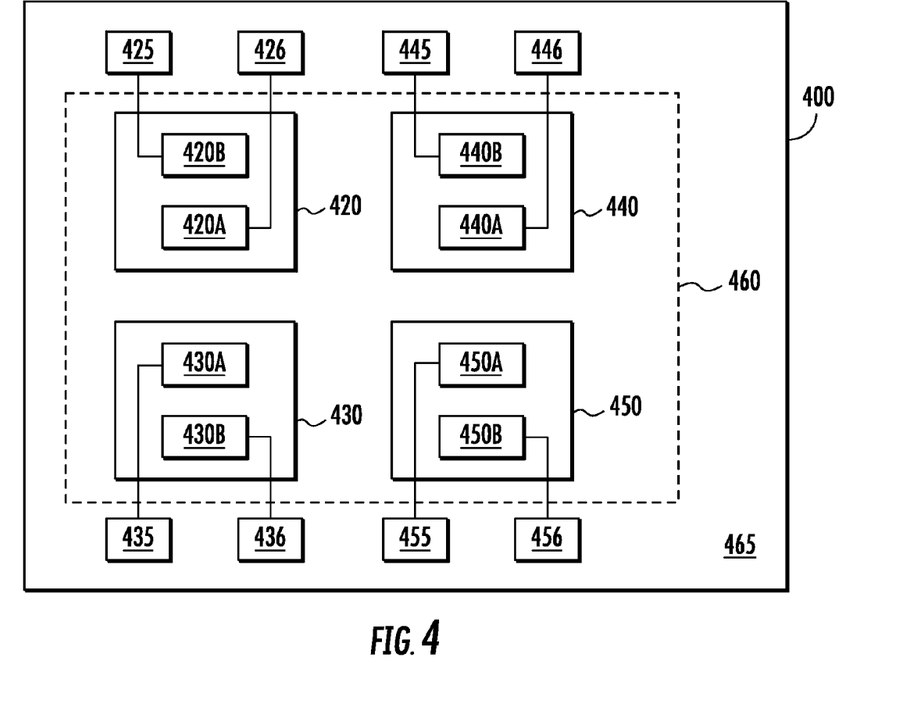
FIG. 4 shows protection switches and the components they protect in accordance with other embodiments of the present invention.

It will be appreciated that while FIG. 2 shows an exposed area 201 containing both an analog block 210 and a digital block 220, in other embodiments the exposed area 201 contains one or more analog blocks, one or more digital blocks, but not both. In accordance with other embodiments of the invention, an exposed area is divided into multiple blocks containing electronic components, such that power to each block is controlled by a dedicated power element. Dividing the multiple blocks in this way allows smaller blocks to be isolated and later disabled, if necessary. FIG. 4 shows a portion of a contact sensor 400 in accordance with one embodiment of the present invention. The contact sensor 400 comprises a first block of electronic components 420 containing a digital block 420A controlled by a dedicated power switch 426 and an analog block 420B controlled by a dedicated power switch 425; a second block of electronic components 430 containing a digital block 430A controlled by a dedicated power switch 435 and an analog block 430B controlled by a dedicated power switch 436; a third block of electronic components 440 containing a digital block 440A controlled by a dedicated power switch 446 and an analog block 440B controlled by a dedicated power switch 445; and a fourth block of electronic components 450 containing a digital block 450A controlled by a dedicated power switch 455 and an analog block 450B controlled by a dedicated power switch 456. The blocks 420, 430, 440, and 450 are all contained in an uncovered or exposed area 460, and the power switches 425, 426, 435, 436, 445, 446, 455, and 456 are all contained in a covered or un-exposed area 465.

If it is later determined that the block 420B is irreparably damaged, such as by an over current condition, then the power switch 425 is able to permanently disconnect power from the block 420B, removing one-eighth of the electronics (e.g., sensing elements) of the finger sensor from operation, leaving seven-eighths for use. If a single power switch were used to control power to the entire block 420 and the entire block 420 must be permanently disconnected because the block 420B is damaged, a larger portion of the sensing array would be lost to use. It will thus be recognized that by increasing the number of blocks (e.g., 420, 430, 440, and 450), each having a dedicated power switch, when a portion of the finger sensor is disconnected due to damage, the damage is better isolated and a larger portion of the finger sensor remains available for use.

Figure 5:
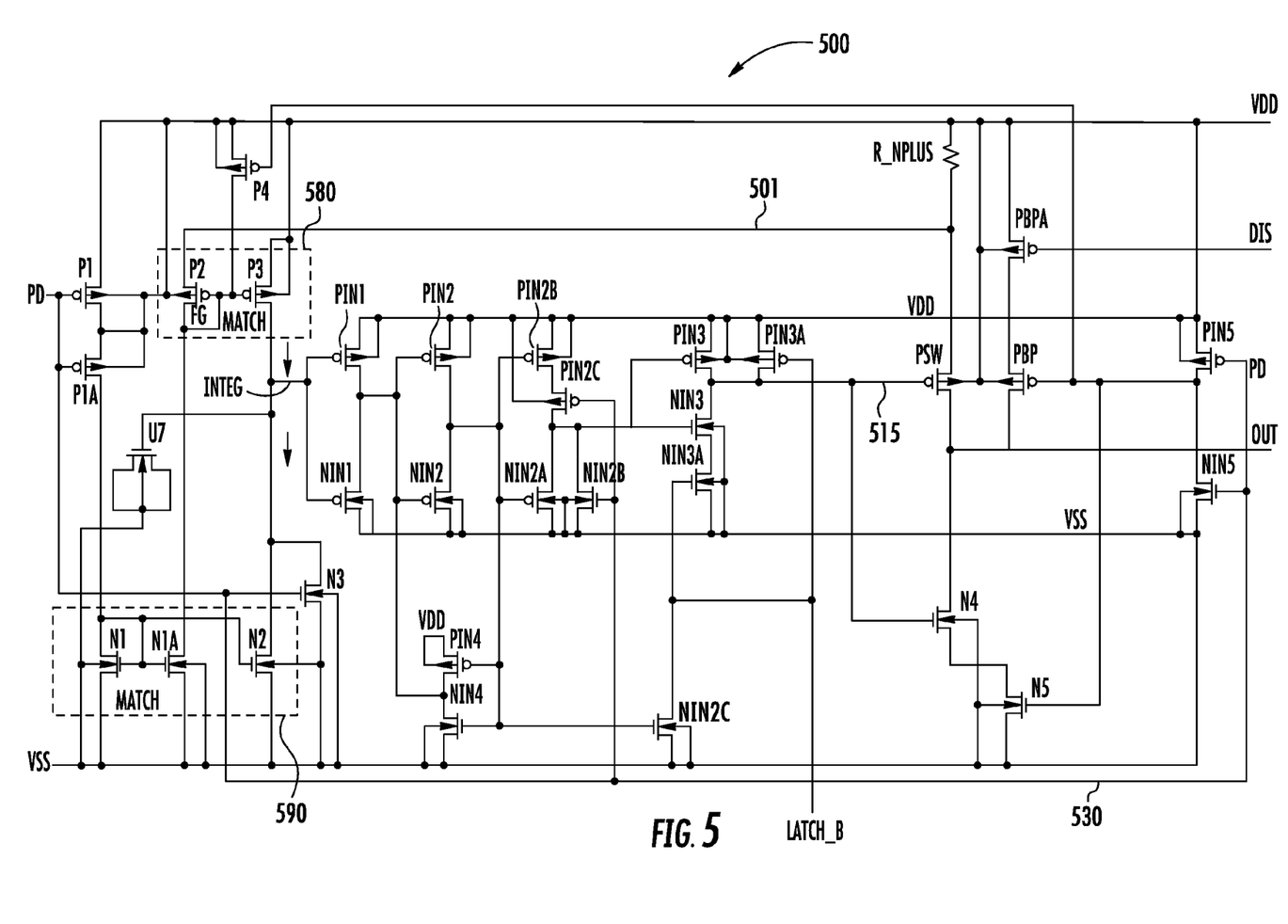
FIG. 5 is a schematic circuit diagram of a protection switch in accordance with one embodiment of the present invention.

FIG. 5 is a schematic diagram for a current switch 500 in accordance with one embodiment of the present invention. Those skilled in the art will recognize from the schematic diagram that the current switch contains PMOS and NMOS transistors. The PMOS and NMOS transistors can be replaced with other types of transistors. The output lines labeled VDD, VSS, OUT, LATCH_B refer to signal lines with the same function as similarly labeled lines in FIG. 2. The current switch 500 includes an over-current detector amplifier (transistors N1-N3, P1-P4, resistor R_NPLUS, and a capacitor connected transistor U7), a Schmitt trigger (transistors PIN1, PIN2, PIN4, NIN1, NIN2, NIN4), mode control logic (PIN2B, PIN2C, PIN3, PIN3A, PIN5, NIN2A, NIN2B, NIN2C, NIN3, NIN3A, NIN5, N4, N5), and switch transistors PSW, PBP, PBPA. The current switch 500 has two input lines PD (power down), DIS (disconnect), one output line OUT, one input/output line LATCH_B, a power supply VDD line, and a local ground VSS.

The VDD line is coupled to the source and bulk (substrate) of the transistors PBPA, PIN5, PIN1, PIN2, PIN2B, PIN3, PIN3A, P1, P3, P4, to the bulks of P1A, P2, PBP and PSW, and to a first end of the resistor R_NPLUS. The VSS line is coupled to the bulk, the drain and source of the transistor U7, to the bulk and source of the transistors N1, N1A, N2, N3, NIN1, NIN2, NIN2A, NIN2B, NIN3A, NIN4, NIN2C, N5, NIN5, and to the bulk of the transistors N4 and NIN3. The gate of the transistor P4 is coupled to the gate of the transistor PBP, to the gate of the transistor N5, to the drain of the transistor PIN5, and to the drain of the transistor NIN5.

The DIS line is coupled to the gate of the transistor PBPA. The PD line is coupled to the gates of the transistors P1, P1A, PIN2C, and PIN5, and to the gates of the transistors N3, NIN2B, and NIN5. The LATCH_B line is coupled to the gate of the transistor NIN3A, the drain of the transistor NIN2C, and the gate of the transistor PIN3A. A line 501 couples the drains of the transistors P2 and PSW to a second end of the resistor R_NPLUS. The INTEG line couples the drain of the transistor P3, the gate of the transistor U7, the drain of the transistor N3, the drain of the transistor N2, the gate of the transistor PIN1, and the gate of the transistor NIN1. The drain and gate of the transistor N1 are both coupled to the drain of the transistor P1A, to the gate of the transistor N1A, and to the gate of the transistor N2. The gate and the drain of the transistor P2 are both coupled to the drain of the transistor P4, to the gate of the transistor P3, and to the drain of the transistor N1A.

The VOUT line couples the drains of the transistors PBP and PSW to the drain of the transistor N4. The source of the transistor N4 is coupled to the drain of the transistor N5. The line 515 couples the gate of the transistor N4 to the gate of the transistor PSW, to the drain of the transistor PIN3A, to the drain of the transistor PIN3, and to the drain of the transistor NIN3.

The gate of the transistor NIN3 is coupled to the gate of the transistor PIN3 and to the drains of the transistors NIN2A and NIN2B, and to the drain of the transistor PIN2C. The drain of the transistor PIN1 is coupled to the drain of the transistor NIN1, to the gates of the transistors PIN2 and NIN2, to the drain of the transistor PIN4, and to the drain of the transistor NIN4. The gates of the transistors NIN4 and NIN2C are coupled together, to the gates of the transistors PIN4, NIN2A, and PIN2B, to the drain of the transistor PIN2, and to the drain of the transistor NIN2. The bulk of the transistor PIN4 is coupled to its source. The drain of the transistor PBPA is coupled to the source of the transistor PBP.

As explained above, the current switch 500 has three modes of operation: operating mode, standby mode, and disconnect mode. Each of these modes is now explained in relation to the components in FIG. 5. First, in the operating mode both of the signals PD and DIS are set LOW. This disables the current bypass transistor PBP and enables the over-current detector amplifier along with the mode control logic. The current switch 500 is now able to detect over currents. The signal LATCH_B, which is normally HIGH in this mode (using a pull up PMOS outside of this block), is coupled in wired OR configuration with similar current switches, used to thereby disconnect the power supply (VDD), if either one or more of the current switches detects an over-current condition. The current switch 500 provides the power supply voltage from power line VDD to the output terminal OUT through the switch transistor PSW, which is normally in an ON state in this mode, and resistor R_NPLUS, which is used for the over-current detection. The voltage drop across the resistor R_NPLUS is the input signal for the over-current detector amplifier P2/P3/N1A/N2. The amplifier includes two skewed current mirrors 580 and 590 coupled to the summation node INTEG. The transistors of the over-current detector amplifier current mirrors are sized so that the current sink, normally provided by the transistor N2 of the amplifier, is stronger than current source provided by the transistor P3. This current difference pulls the INTEG node to the ground potential. Because there are an even number of inversions (4) between the INTEG node and the gate node of the switch transistor PSW, its gate is the ground potential too and the switch transistor PSW is in an ON state.

When the current supplied to the output node exceeds some threshold level, the voltage drop across the resistor R_NPLUS becomes sufficient to turn the current ratio of the amplifier current mirrors in opposite directions. This happens because the bias voltage of the current source transistor P3 is the sum of the gate-source voltage of P2 and the voltage drop across the resistor R_NPLUS. Because the current source transistor P3 now overrides the current sink, the voltage of the INTEG node starts to rise. The slew rate is established by the values of the current difference of the source and sink and the capacitor U7. Thus, the higher the voltage drop across the resistor R_NPLUS, the faster the voltage at the INTEG node is increasing. The delay is used to prevent false triggering of the current switch 500 as the result of brief current spikes occurring during the normal operation of the current switches, coupled to the OUT node of the switch, and during the initial power supply ramp up. When the voltage at the INTEG node exceeds the upper threshold of the Schmitt trigger, the gate voltage of the switch transistor PSW goes high and turns this transistor off. At the same time, the transistor N4 turns on and pulls the output terminal OUT to ground. Simultaneously, the transistor NIN2C turns on, pulling the LATCH_B line to ground. This induces similar OFF conditions to all the switch transistors of all the current switches connected in wired OR configuration along their LATCH_B lines.

Although the voltage across the resistor R_NPLUS instantaneously drops to 0 and the current sink of the over-current detector amplifier becomes stronger than the current source, it takes some time to discharge the capacitor U7 coupled to the INTEG node down to the lower threshold voltage of the Schmitt trigger. During this time the OUT line stays grounded. The duration of this state should be sufficient for all latch-up conditions that caused the over-current to disappear. When the Schmitt trigger flips, the current switch is returned to the normal operation state.

In the standby mode, the signal on the line PD is set HIGH and the signal on the DIS line is LOW. The current bypass transistor PBP is enabled and the over-current detector amplifier along with the mode control logic and the current switch transistor PSW are disabled. The signal on the LATCH_B line no longer affects the operation of the current switch 500. The current switch 500 provides the power supply voltage from the power line VDD to the OUT terminal through two relatively weak bypass transistors PBP and PBPA in series. The sizes of the transistors PBP and PBPA are chosen such that the current they can provide is sufficient to maintain standby conditions of the respective blocks of the integrated circuit, but too small to sustain any latch-up condition anywhere in the integrated circuit. Since the over-current protection amplifier is disabled, the current switch 500 does not consume any current in standby mode of operation.

In the disconnect mode, both of the signals PD and DIS are set HIGH. The only difference between the disconnect and the standby mode is that in the disconnect mode the bypass current path is cut off and no current can be provided to the OUT terminal. This mode of operation is used to permanently disconnect damaged blocks from the power supply.

In those embodiments that use metal oxide semiconductors (MOS) to implement the contact detector, the PMOS transistors are placed substantially far away from NMOS transistors so that the current switch 500 itself is substantially immune to latch-up and any resulting permanent damage. Those skilled in the art will recognize proper spacing for the PMOS and NMOS transistors, which is based on feedback gains and the sizes of transistor components.

Figure 6:
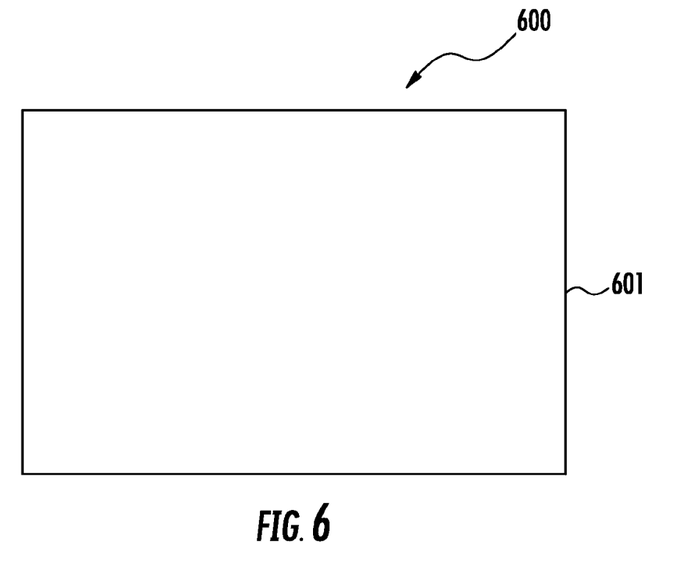
FIGS. 6 and 7 show top and side views, respectively, of a semiconductor substrate during a first processing step for forming a contact detector having protection switches in accordance with the present invention.
Figure 7:
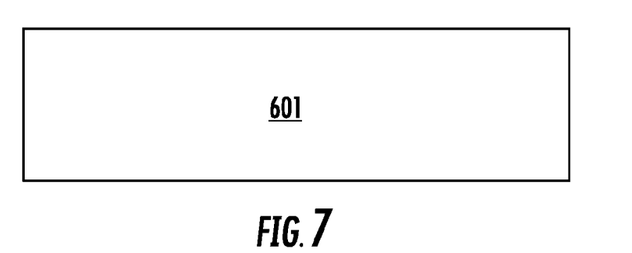
Figure 8:
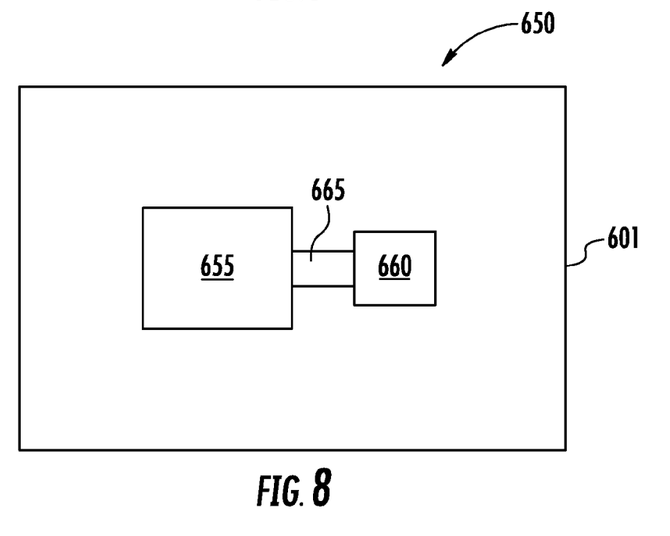
FIGS. 8 and 9 show top and side views, respectively, of the semiconductor substrate of FIGS. 6 and 7, during a second processing step for forming a contact detector having protection switches in accordance with the present invention.
Figure 9:
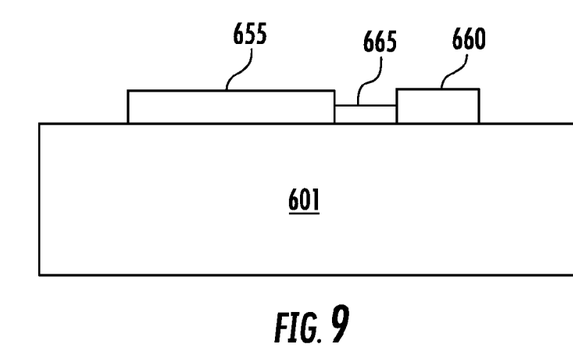

In a preferred embodiment, the power switches and other components of a contact detector circuit in accordance with the present invention are fabricated as part of a single integrated circuit. FIGS. 6-11 show steps for fabricating a detector circuit in accordance with one embodiment of the present invention. Identical elements are labeled with the same number. FIGS. 6 and 7 show, respectively, top and side cross-sectional views of a structure 600 containing semiconductor substrate 601. FIGS. 8 and 9 show, respectively, top and side cross-sectional views of a structure 650 containing the semiconductor substrate 601 after a first set of electronics 655, a channel 655, and a protection element 660 are formed on it. The first set of electronics 655 are for capturing and processing image data. The channel 665 couples the first set of electronics 655 to a protection element 660.

Figure 10:
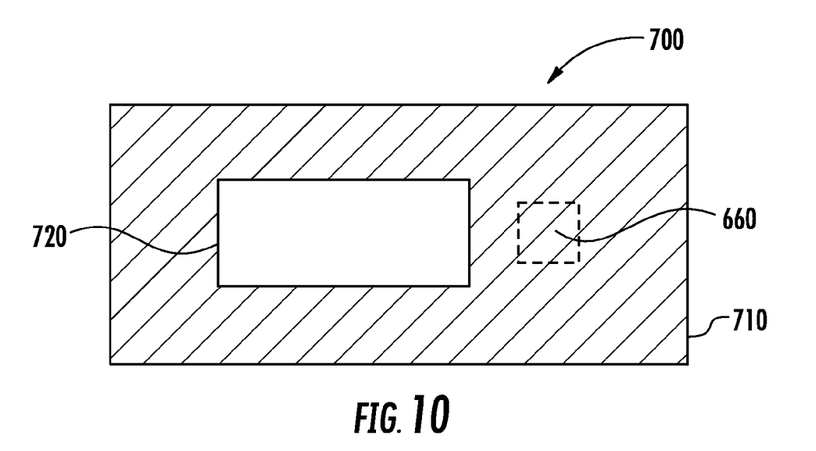
FIGS. 10 and 11 show top and side views, respectively, of the semiconductor substrate of FIGS. 8 and 9, during a third processing step for forming a contact detector having protection switches in accordance with the present invention.
Figure 11:
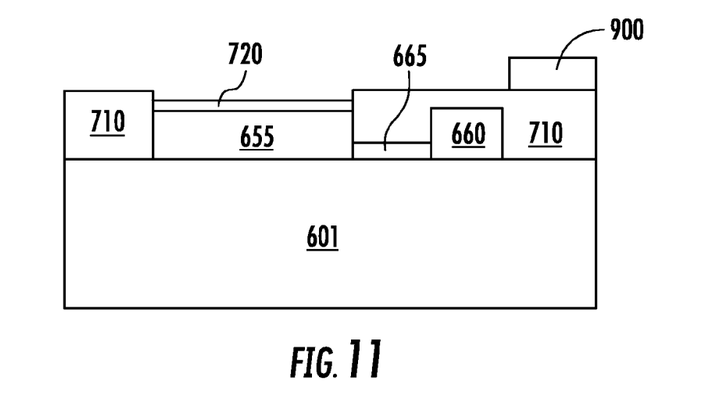

FIGS. 10 and 11 show, respectively, top and side cross-sectional views of a structure 700, which is the structure 650 after an insulating layer 710 has been formed over the protection element 660 (shown in phantom, outlined by dashed lines) and a passivation layer 720 has been formed over the electronics 655 to form an exposed portion. The insulating layer 710 includes a non-conductive materail. In the illustrated embodiment, the insulating layer 710 also includes a grounded conductive material 900, such as a metal, overlying the non-conductive material.

Figure 12:
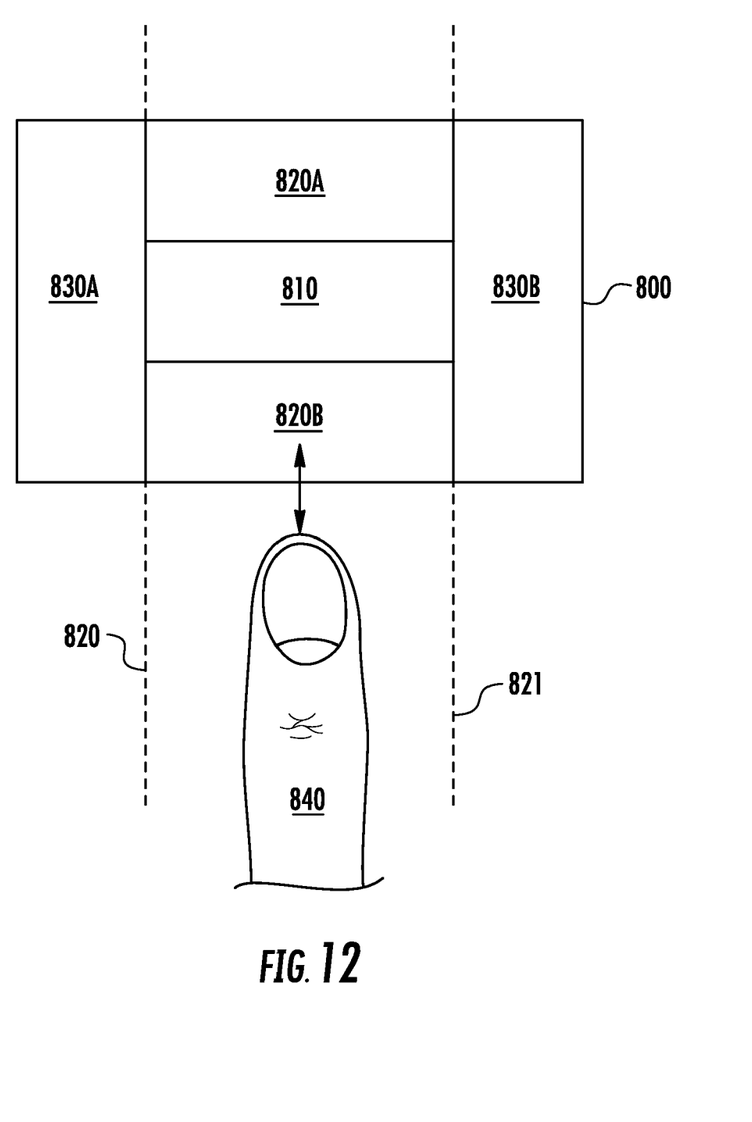
FIG. 12 shows a finger sensor having an exposed surface bordered by an insulating surface overlying protection switches in accordance with the present invention.

Those skilled in the art will recognize other structures in accordance with the present invention. For example, FIG. 12 shows a finger swipe sensor 800 having an exposed area 810 bordered on opposing ends by the unexposed areas 820A and 820B. Because a finger 840 traveling along the finger swipe sensor 800 only travels between the lines 820 and 821 (a swipe area defined by a swipe direction and does not include the areas 830A and 830B), an insulating layer does not need to cover the areas 830A and 830B.

It will be readily apparent to one skilled in the art that other modifications may be made to the embodiments without departing from the spirit and scope of the invention as defined by the appended claims.

We claim:

1. A fingerprint sensor comprising:
an integrated circuit (IC) including a sensing area for contacting a finger of a user positioned adjacent thereto; and
a dielectric layer over said IC and having an opening therein aligned with the sensing area;
said IC comprising
a first plurality of circuits accessible through the opening,
a second plurality of circuits covered by said dielectric layer,
a plurality of switches coupling said first and second pluralities of circuits to a power supply, and
a controller for selectively connecting the power supply to said first and second pluralities of circuits based upon a detected overcurrent condition and for permanently disconnecting the power supply from said first and second pluralities of circuits based upon repeated detected overcurrent conditions, the connecting of said first plurality of circuits being independent from the connecting of said second plurality of circuits.

2. The fingerprint sensor of claim 1 wherein said controller selectively controls a respective switch based upon monitoring of current associated with a respective circuit.

3. The fingerprint sensor of claim 1 wherein said first plurality of circuits comprises an array of sensing elements for capturing fingerprint images.

4. The fingerprint sensor of claim 1 wherein said first plurality of circuits comprises digital components for processing swiped finger image data.

5. The fingerprint sensor of claim 1 wherein said dielectric layer surface comprises a polymeric material.

6. The fingerprint sensor of claim 1 further comprising grounded conductive material over said dielectric layer.

7. A method of operating fingerprint sensor comprising an integrated circuit (IC) including a sensing area for contacting a finger of a user positioned adjacent thereto, and a dielectric layer over the IC and having an opening therein aligned with the sensing area, the IC comprising a first plurality of circuits accessible through the opening, a second plurality of circuits covered by the dielectric layer, and a plurality of switches coupling the first and second pluralities of circuits to a power supply, the method comprising:
selectively connecting the power supply to the first and second pluralities of circuits based upon a detected overcurrent condition; and
permanently disconnecting the power supply from the first and second pluralities of circuits based upon repeated detected overcurrent conditions, the connecting of the first plurality of circuits being independent from the connecting of the second plurality of circuits.

8. The method of claim 7 further comprising selectively controlling a respective switch based upon monitoring of current associated with a respective circuit.

9. The method of claim 7 further comprising capturing fingerprint images with an array of sensing elements in the first plurality of circuits.

10. The method of claim 7 further comprising processing swiped finger image data using digital components in the first plurality of circuits.

11. The method of claim 7 wherein the dielectric layer surface comprises a polymeric material.

12. A fingerprint sensor comprising:
an integrated circuit (IC) including a sensing area for contacting a finger of a user positioned adjacent thereto;
a dielectric layer over said IC and having an opening therein aligned with the sensing area; and
grounded conductive material over said dielectric layer;
said IC comprising
a first plurality of circuits accessible through the opening,
a second plurality of circuits covered by said dielectric layer and being lateral to said first plurality of circuits,
a plurality of switches coupling said first and second pluralities of circuits to a power supply, and
a controller for selectively connecting the power supply to said first and second pluralities of circuits based upon a detected overcurrent condition and for permanently disconnecting the power supply from said first and second pluralities of circuits based upon repeated detected overcurrent conditions 13. The fingerprint sensor of claim 12 wherein said controller selectively controls a respective switch based upon monitoring of current associated with a respective circuit.

14. The fingerprint sensor of claim 12 wherein said first plurality of circuits comprises an array of sensing elements for capturing fingerprint images.

15. A method of operating fingerprint sensor comprising an integrated circuit (IC) including a sensing area for contacting a finger of a user positioned adjacent thereto, a dielectric layer over the IC and having an opening therein aligned with the sensing area, and grounded conductive material over the dielectric layer, the IC comprising a first plurality of circuits accessible through the opening, a second plurality of circuits covered by the dielectric layer and being lateral to the first plurality of circuits, and a plurality of switches coupling the first and second pluralities of circuits to a power supply, the method comprising:
selectively connecting the power supply to the first and second pluralities of circuits based upon a detected overcurrent condition; and
permanently disconnecting the power supply from the first and second pluralities of circuits based upon repeated detected overcurrent conditions.

16. The method of claim 15 further comprising selectively controlling a respective switch based upon monitoring of current associated with a respective circuit.

17. The method of claim 15 further comprising capturing fingerprint images with an array of sensing elements in the first plurality of circuits.

* * * * *